UNITED STATES PATENT OFFICE.

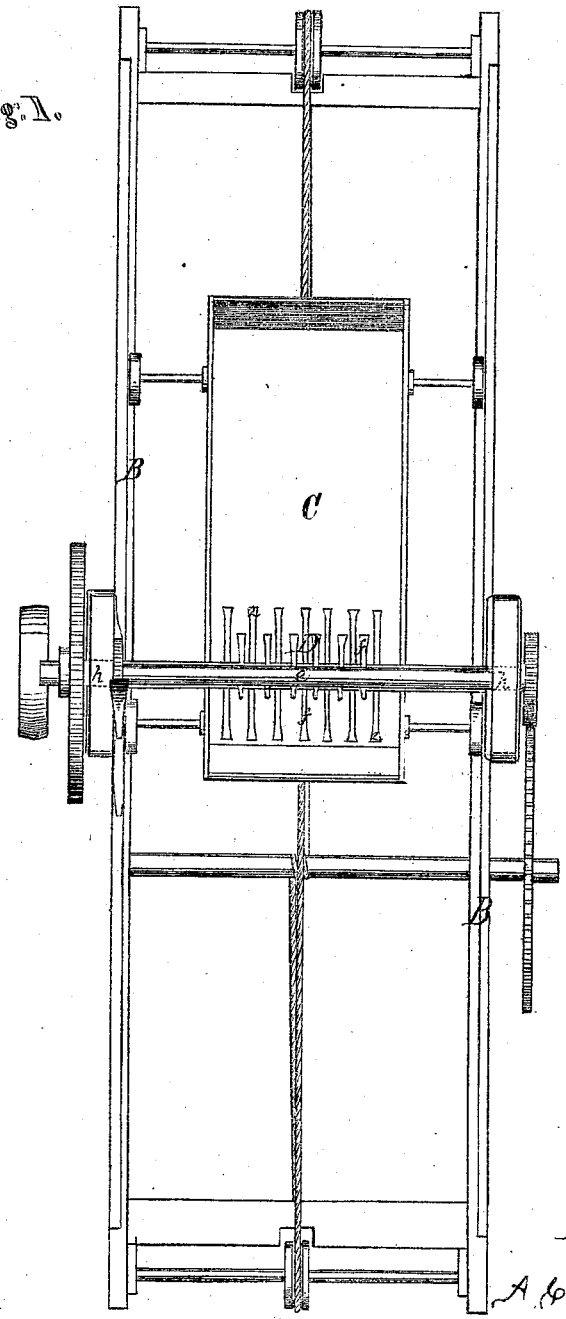

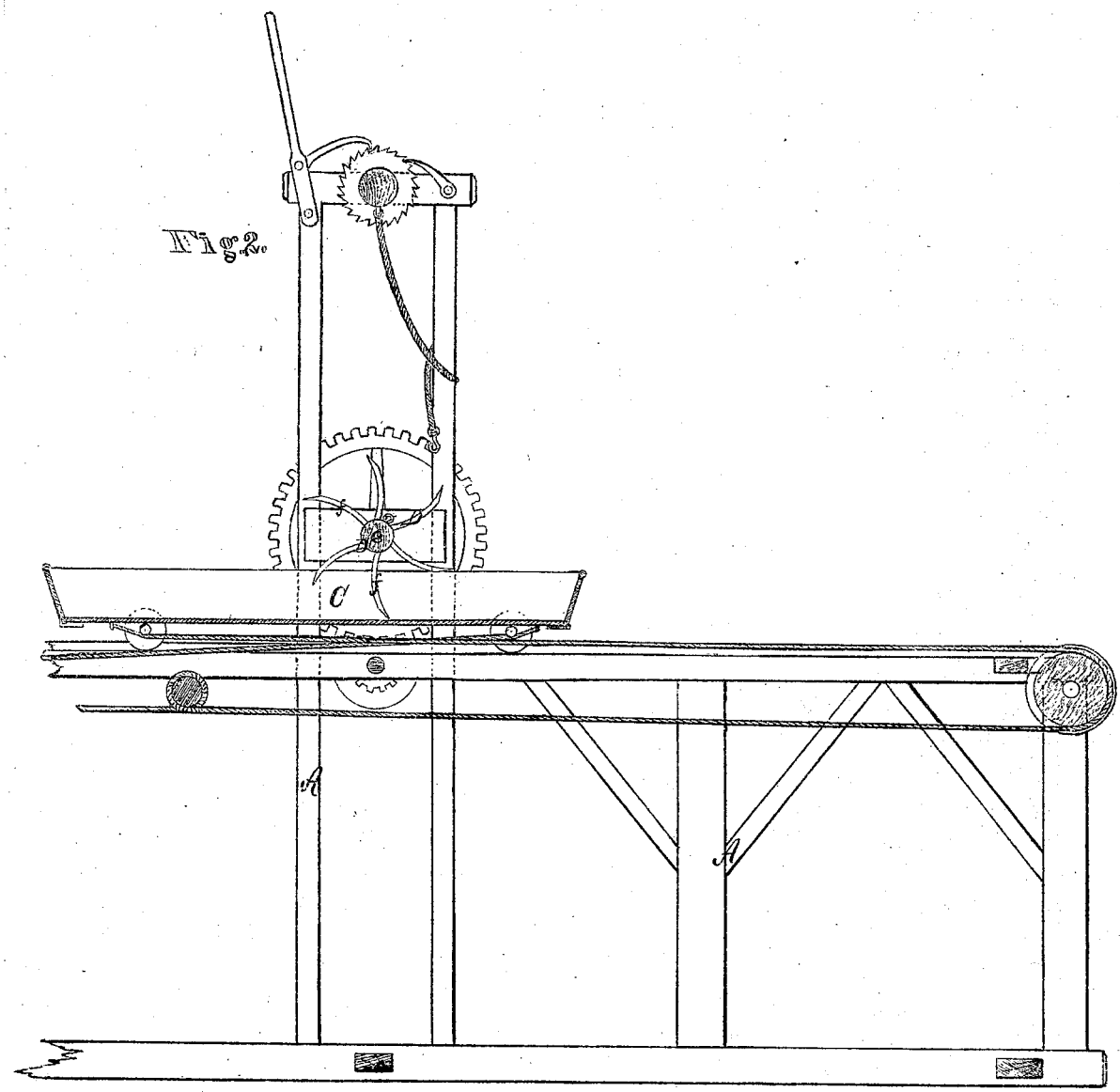

ALBERT C. ELLITHORPE, OF CHICAGO, ILLINOIS.

IMPROVEMENT IN MORTAR-MIXING MACHINES.

Specification forming part of Letters Patent No. 116,172, dated June 20, 1871.

*To all whom it may concern:*

Be it known that I, ALBERT C. ELLITHORPE, of Chicago, in the county of Cook and State of Illinois, have invented a new and valuable Improvement in Mortar-Mixing Machines; and I do hereby declare that the following is a full, clear, and exact description of the construction and operation of the same, reference being had to the annexed drawing making a part of this specification and to the letters and figures of reference marked thereon.

Figure 1 of the drawing is a top view of my invention. Fig. 2 is a central vertical section of the same.

My invention has relation to an improvement in machines for mixing mortar; and it consists in the construction and novel arrangement of devices in which the mortar-bed is designed to be moved to and fro under a stationary mixing-reel, as hereinafter shown and described.

The letter A of the drawing designates a frame-work, upon which the track B is laid. C represents the mortar-car, in which the sand, lime, and other ingredients are mixed to form the mortar. This car moves back and forth upon the track B, and thereby every portion of the bed is brought under the mixing-reel as many times as may be necessary to thoroughly incorporate the ingredients and render the mortar a homogeneous mass. D represents the mixing-reel, consisting of a shaft, $e$, and the curved springing arms $f$, with their flattened ends $z$. This reel bears in journal-seats, which are arranged in slides or boxes $h\ h$. These boxes $h\ h$ have a vertical motion, and are connected with suitable mechanism, by means of which the reel D may be raised or lowered when such action is desirable. The reel is not designed to have a horizontal motion, but it is intended, when lowered in contact with the mortar-bed, to rotate in its journal-seats while the bed moves to and fro under it. The flattened ends $z$ of the curved spring-arms $f$ operate against the bottom or bed of the mortar-car and work the ingredients together in the manner of spatulas, thus producing an eminently plastic compound, which, if worked sufficiently under the reel, cannot fail of being thoroughly homogeneous throughout its whole extent.

The amount of mortar made in my machine at one time may be very great, and yet it will all be of the same quality.

When the mortar is sufficiently worked the reel is raised clear of the car and the latter is moved to the end of the platform A and its contents dumped into suitable receivers.

Claims.

1. In a mortar-machine, the mixing-reel D, provided with the curved springing arms $f$ and the spatula-ends $z$, substantially as specified.

2. The combination, in a mortar-machine, of the rotating reel D having vertical motion, and the mortar-bed $c$ having horizontal motion, substantially as specified.

In testimony that I claim the above I have hereunto subscribed my name in the presence of two witnesses.

ALBERT C. ELLITHORPE.

Witnesses:
    F. B. CURTIS,
    D. D. KANE.